June 4, 1957  J. A. LOUIS ET AL  2,794,267
APPARATUS FOR TREATING SOLID PRODUCTS IN BULK
Filed July 8, 1954  5 Sheets-Sheet 1

INVENTORS
JEAN A. LOUIS
MAURICE KLING
BY *Adams & Bush*
ATTORNEYS

INVENTORS
JEAN A. LOUIS
MAURICE KLING

BY Adams & Bush
ATTORNEYS

June 4, 1957 J. A. LOUIS ET AL 2,794,267
APPARATUS FOR TREATING SOLID PRODUCTS IN BULK
Filed July 8, 1954 5 Sheets-Sheet 3

INVENTORS
JEAN A. LOUIS
MAURICE KLING

BY *Adams + Bush*
ATTORNEYS

FIG. 10.
FIG. 11.
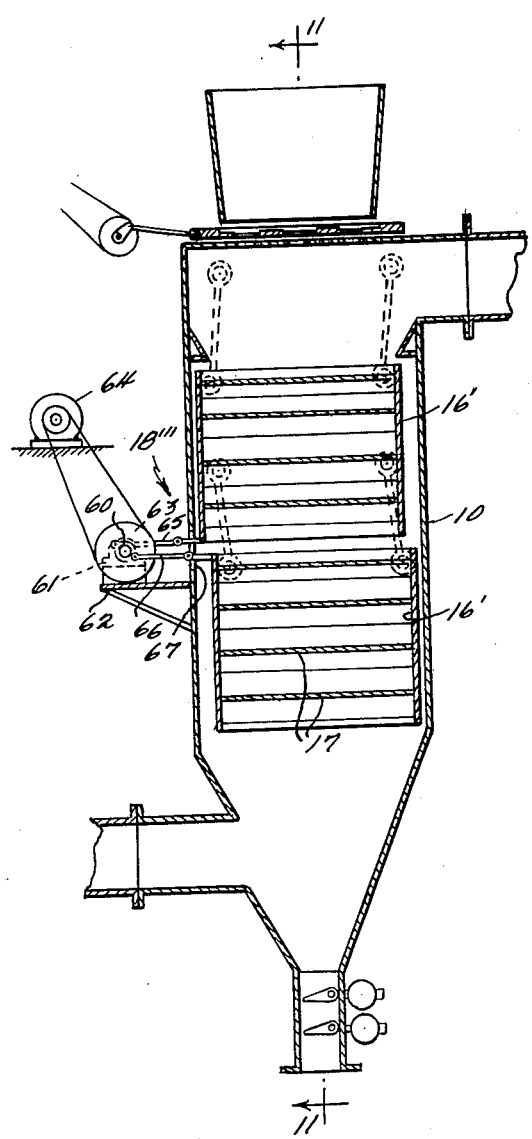
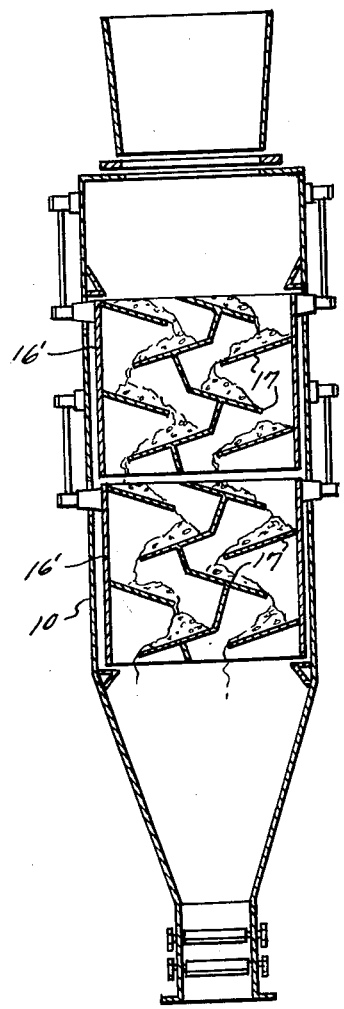
INVENTORS
**JEAN A. LOUIS
MAURICE KLING**
BY *Adams + Bush*
ATTORNEYS

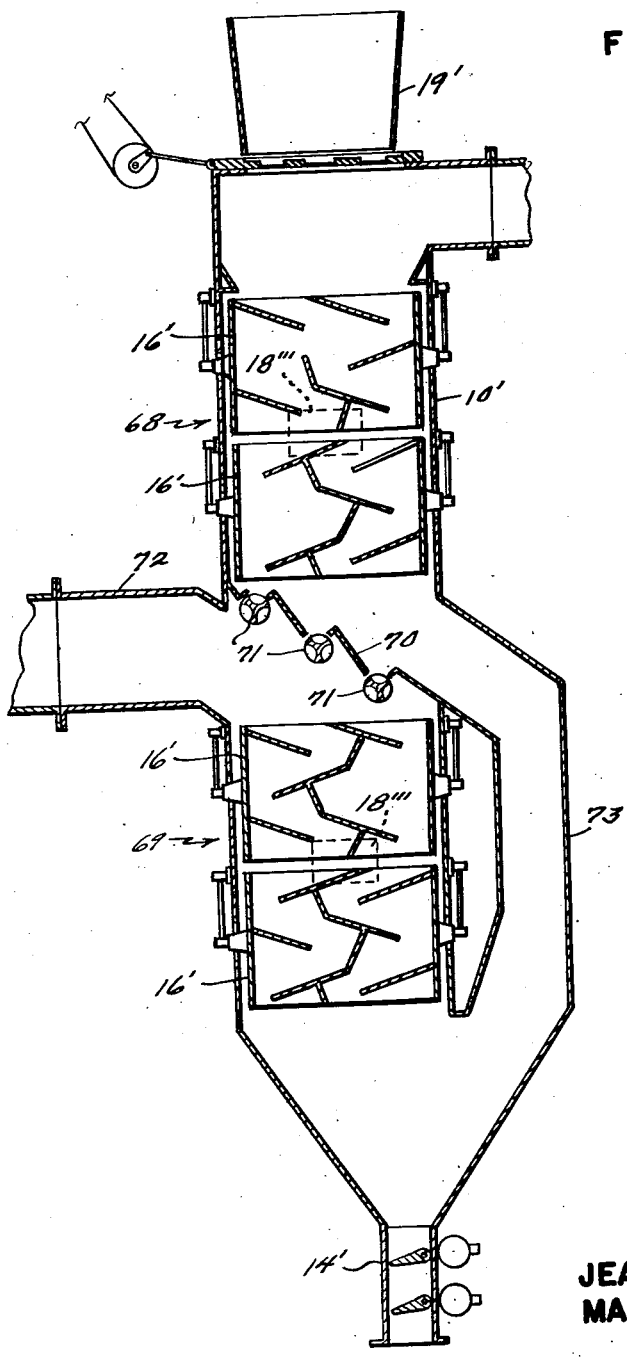

United States Patent Office 2,794,267
Patented June 4, 1957

2,794,267
APPARATUS FOR TREATING SOLID PRODUCTS IN BULK

Jean André Louis, Lyon, and Maurice Kling, Fontainebleau, France, assignors to Société Préparation Industrielle des Combustibles, Fontainebleau, France, a French company Application July 8, 1954, Serial No. 442,073

Claims priority, application France July 8, 1953

14 Claims. (Cl. 34—164)

This invention relates to apparatus for treating soild products in bulk and has more particular reference to such apparatus wherein the solid products are submitted to the action of a gaseous fluid.

One object of the present invention is to provide novel and improved apparatus for treating soild products in bulk, as characterized above, wherein the products to be treated travel by gravity through one or more treating chambers containing a plurality of trickling elements so arranged that the products will be caused to trickle across the elements as they travel through the chamber, either with or against the flow of the gaseous fluid therethrough, and wherein means are provided to give the chamber a controlled vibratory motion in a direction to cause the products to travel in a zig zag path on each trickling element, thereby spreading the products in regular layers on the trickling elements and controlling the speed of the products across the elements and the time required for passage through the treating chamber.

Another object of the present invention is to provide novel and improved apparatus for treating solid products in bulk, as characterized above, wherein a plurality of treating chambers are mounted within a single tower or casing divided into two sections with one or more treating chambers mounted in each section, and wherein means are provided for directing the flow of the treating fluid in one direction through one of the sections and in the opposite direction through the other section.

A further object of the present invention is to provide novel and improved apparatus for treating solid products in bulk, as characterized above, which is simple and rugged in construction, efficient in operation and extremely flexible in its adaptation.

Other objects and advantages of the invention will appear in the following specification when considered in connection with the accompanying drawings, wherein:

Fig. 10 is a view similar to that shown in Fig. 1, but showing a modified form of the apparatus;

Fig. 11 is a view taken on the line 11—11 of Fig. 10;

Fig. 12 is a view similar to that shown in Fig. 11, but showing another modified form of the apparatus.

The present invention provides novel and improved apparatus for treating soild products in bulk by submitting the products to the treating action of a gaseous fluid. In general, the apparatus comprises one or more treating chambers through which the products to be treated travel by gravity, each chamber containing a plurality of vertically spaced horizonally extending rows of laterally spaced inclined trickling elments, with all of the trickling elements in each row inclined in the same direction and with that direction being opposite to the direction of inclination of the trickling elements in the rows immediately thereabove and therebelow, whereby the products being treated will be caused to trickle through the chambers either with or against the flow of the gaseous fluid therethrough; and means for vibrating each of the treating chambers in a direction to cause the products being treated to follow a zig zag path across the trickling elements therein, whereby the time required for the products to flow across the trickling elements will be controlled as well as the time the products are in contact with the gaseous fluid, and the products will be spread in regular layers on each trickling element.

Figure 1:
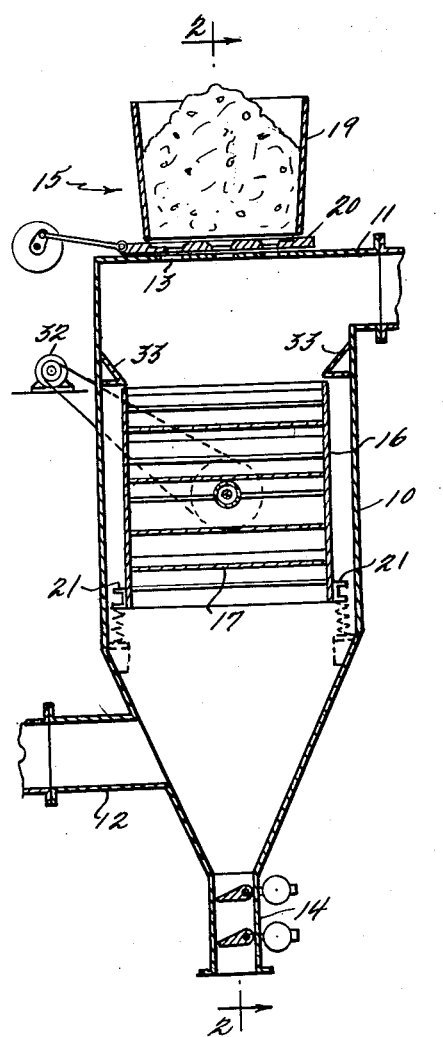
Fig. 1 is a vertical sectional diagrammatic view of one embodiment of apparatus construction in accodrance with the present invention.
Figure 2:
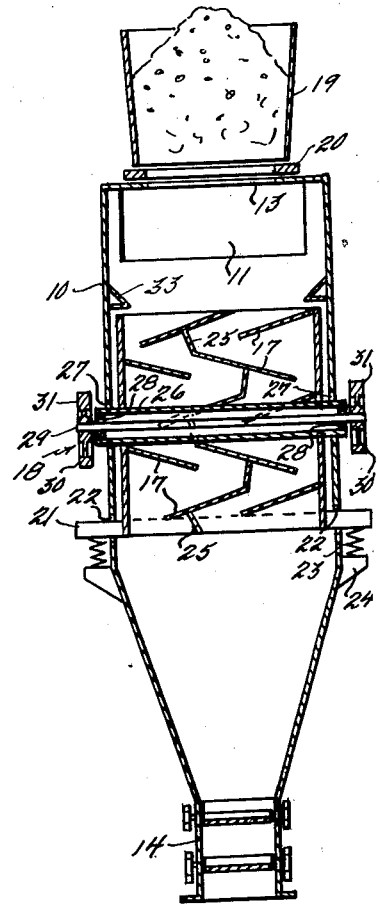
Fig. 2 is a view taken on the line 2—2 of Fig. 1.

Referring now to the drawings, there is illustrated, in Figs. 1 and 2, one embodiment of apparatus constructed in accordance with the present invention. As there shown, the apparatus comprises an upright tower or casing 10 having inlet-outlet gas conduits 11, 12 connected to its top and bottom portions, respectively, for the passage of gases or fluids, an inlet opening 13 at its top and a valved outlet conduit 14 at its bottom for the passage of the products to be treated; feeding means, indicated generally at 15, for feeding the products to be treated into the top of the tower; a hollow open-ended casing or treating chamber 16 mounted within the tower 10 and carrying a plurality of inclined trickling elements 17; and vibrating means, indicated generally at 18, for vibrating the casing 16.

The tower 10 may be of any suitable size and shape. In the particular embodiment of the invention illustrated, it is shown as being generally rectangular in cross section with the walls of the lower portions inclined downwardly and inwardly to the valved outlet conduit 14. The tower is provided with an inlet-outlet conduit 11 connected to its upper end portion and in inlet-outlet conduit 12 connected to its lower end portion to permit the flow of the treating gaseous fluid through the tower in either direction.

The feeding means 15 provided for feeding the solid products to be treated into the tower 10, may be of any suitable usual type. As shown, such means comprises a bunker 19 mounted on top of the tower in communcation with the inlet opening 13 therein, and with the admission of the solid products regulated by a reciprocatory feeder 20.

The treating chamber or casing 16 may be any suitable size and shape. It shown as a hollow open-ended rectangular member spring mounted within the tower 10 by means of a pair of elongated beams or structural members 21, 21, each secured to the bottom edge portion on opposite sides of the casing, with its ends extending through enlarged openings 22 in the side walls of the tower 10 and attached to springs 23 mounted on supporting brackets 24 fixedly attached to the side walls of the tower 10.

The trickling elements or members 17 are generally similar in construction and each is shown in the form of an elongated flat member extending transversely of the casing 16 with its ends fixedly attached to the side walls of the casing.

As shown in Fig. 2, the members 17 are arranged in a plurality of vertically spaced horizontally extending rows, with all of the members in each row inclined in the same direction, with that direction being opposite to the direction of inclination of the members in the rows immediately thereabove and therebelow. As viewed in Fig. 2, all of the members 17 in the top horizontal row are inclined downwardly and to the left, all of the members in the second row are inclined downwardly and to the right, and all of the members in each of the succeeding rows are inclined downwardly alternately to the left and right. The members in each row are positioned to receive the products from the members in the row immediately thereabove and discharge them onto the members in the row immediately therebelow in a trickling flow. The members 17 in each horizontal row below the first or top row may be provided with upstanding flanges 25 extending along their upper edges to guide the flow of the solid products.

While the casing 16 may be vibrated by any suitable means, the particularly vibrating means employed and indicated generally at 18, are shown as comprising a hollow tube 26 fixedly attached to the casing 16 and extending horizontally through the center thereof, with its projecting ends extending through enlarged openings 27 formed in the end walls of the tower 10 and carrying bearing members 28, 28; a shaft 29 mounted within the tube 26 and journaled in the bearings 28, with its ends projecting from the ends of the tube and having pulleys 30, 30 fixedly secured thereon. The pulleys have eccentric weights 31, 31, fixedly secured thereon in horizontal alignment with each other. One of the pulleys is connected to be belt driven by any suitable means such as motor 32. The construction and arrangement is such that, as the two eccentric weight pulleys rotate they impart to the casing 16, through the tube 26 fixedly attached thereto, a circular vibration, with the result that the products being treated are spread in regular layers on the trickling element 17 and travel in a zig zag path thereacross until they fall on the next trickling element therebelow.

The operation of the apparatus is apparent. The products to be treated are fed into the top of the tower 10 by the feeding device 15 and fall by gravity onto the top row of trickling elements 17 in the treating chamber 16 and, as the chamber is given a circular vibration by the vibrating means 18, they will follow a zig zag path across each succeeding trickling element until they emerge from the bottom of the chamber 16 and fall into the bottom of the tower, where they are evacuated through the valved outlet conduit 14.

The treating gases from a suitable source (not shown) may enter the tower 10 through the inlet-outlet conduit 12, pass upwardly through the treating chamber 16, and out through the inlet-outlet conduit 11, or they may flow in the reverse direction.

The contact between the treating gaseous fluid and the products takes place simultaneously, on the one hand, through contacting of the spread layers of products on the trickling elements and, on the other hand, by the passage of gases across the curtains of trickling products, as they fall through the apparatus, thus resulting in a very efficient contact between the treating gases and the products to the treated.

Baffle members 33 having inclined surfaces may be secured to the side walls of the tower 10 and positioned above the chamber 16 to prevent any of the solid products from falling between the chamber 16 and the side walls of the tower 10; likewise, to prevent the gaseous fluid from flowing upwardly between the chamber 16 and the side walls of the tower, additional baffle members 33 may be secured to the side walls of the tower below the chamber 16.

Figure 3:
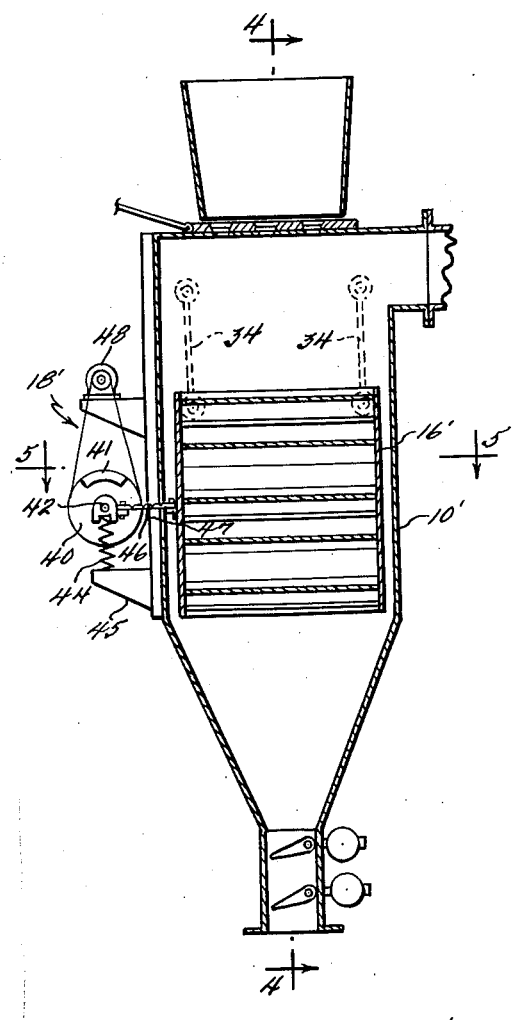
Fig. 3 is a view similar to that shown in Fig 1, but showing a modified form of the apparatus.
Figure 4:
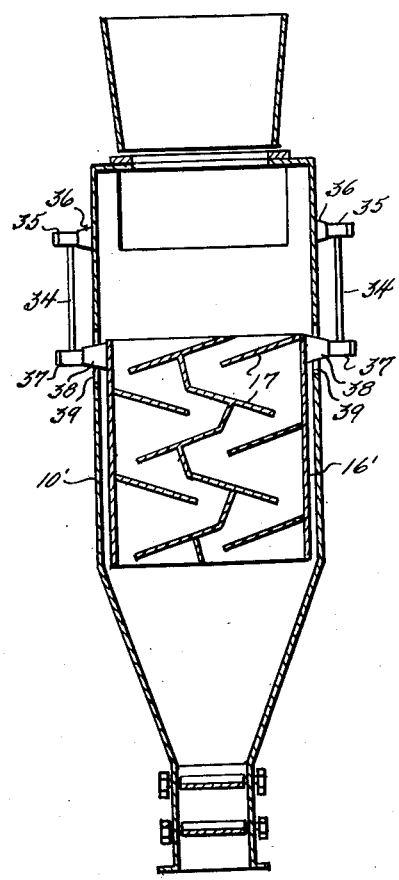
Fig. 4 is a view taken on the line 4—4 of Fig. 3.
Figure 5:
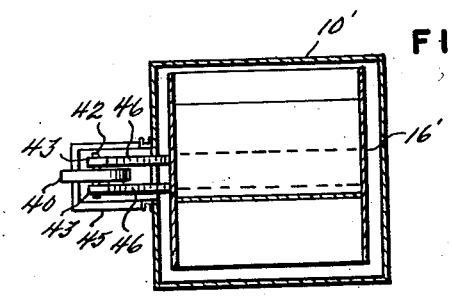
Fig. 5 is a view taken on the line 5—5 of Fig. 3.

In Figs. 3, 4 and 5 there is shown a modified form of apparatus in which the treating chamber is given a substantially horizontal rectilinear vibration.

In this particular modification, the treating chamber 16′, which is identical to the chamber 16 shown in Figs. 1 and 2, except for the elimination of the tube 26 therefrom, is suspended within the tower 10′, as by means of four connecting rods 34, one at each corner of the casing with its upper end pivotally connected to an axle 35 carried by a support 36 fixedly attached to the outer wall of the tower 10′ and pivotally connected at its lower end to an axle 37 carried by a support 38 fixedly attached to the upper end of the casing 16′ and projecting through an enlarged opening 39 formed in the side wall of the tower 10′. The casing 16′ carries a plurality of trickling elements 17 arranged therein in a similar manner to the arrangement of the elements in the casing 16 shown in Figs. 1 and 2.

The means for giving the casing a horizontal rectilinear vibrating motion, indicated at 18′, are shown as comprising a pulley 40 carrying an eccentric weight 41 mounted on a shaft 42 having its ends journaled in bearing members 43, 43 supported by springs 44, 44 mounted on a support 45 fixedly attached to the wall of the tower 10′. Blade or strap members 46, 46 extending through an opening 47 in the side wall of the tower 10′ connect the bearing members 43, 43 to the side wall of the casing 16′. The strap members 46 are flexible in a vertical plane but are rigid in a horizontal plane. The eccentric weight pulley 40 is belt driven by any suitable means, such as a motor 48. The construction and arrangement is such that as the eccentric weight pulley is rotated the effect of the eccentric weight in a vertical plane is canceled, being absorbed by the springs 44. Thus, only substantially horizontal vibrations are transmitted to the chamber 16′ and in a direction to cause the products being treated to travel in a zig zag path across the trickling elements 17.

The operation of this modified form of apparatus is similar to that of the apparatus shown in Figs. 1 and 2. However, the substantially horizontal rectilinear vibratory motion results in a far better spreading effect of the products on the trickling elements than is obtained by the circular vibratory motion of the modification shown in Figs. 1 and 2.

Figure 6:
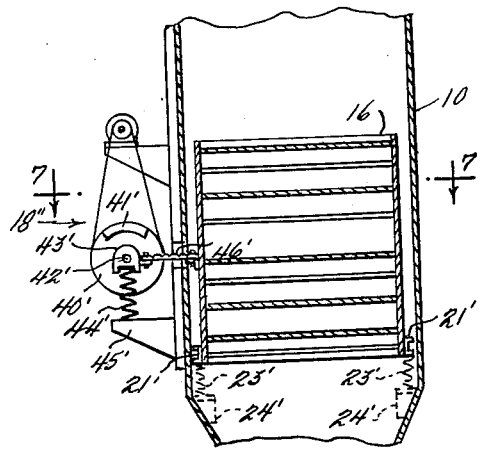
Fig. 6 is a fragmentary view similar to that shown in Fig. 3, but showing another modified form of apparatus.
Figure 7:
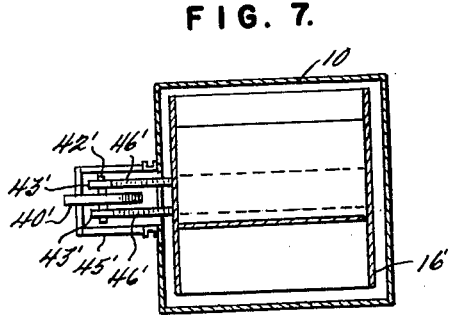
Fig. 7 is a view taken on the line 7—7 of Fig. 6.

In Figs. 6 and 7 there is shown another modified form of the apparatus in which the treating chamber is given an elliptical vibratory motion.

In this particular modification, the treating chamber 16′ is identical in construction to the chamber 16 shown in Figs. 1 and 2, and is spring mounted within the tower 10 by means of beams 21′, 21′ fixedly secured to the bottom edge portion on opposite sides of the chamber, with their ends extending through opposite side walls of the tower and attached to springs 23′ mounted on supporting brackets 24′, in the same manner as the chamber 16 is mounted in the modification shown in Figs. 1 and 2.

The means for vibrating the chamber, indicated at 18″, are identical in construction to the corresponding vibrating means shown in the modification illustrated in Figs. 3, 4 and 5, and comprise a pulley 40′ carrying an eccentric weight 41′ mounted on a shaft 42′ having its ends journaled in bearing members 43′ supported by springs 44′ mounted on a support 45′ fixedly attached to the wall of the tower 10. Blade or strap members 46′, 46′ extending through an opening in the side wall of the tower 10 connect the bearing members to the side wall of the casing 16. The strap members 46′ are flexible in a vertical plane and rigid in a horizontal plane. The construction and arrangement is such that, as the eccentric weight pulley is rotated, the treating chamber will be given an elliptical vibratory motion and in a direction to cause the products being treated to travel in a zig zag path across the trickling elements 17.

The operation of this modification is similar to the operation of the apparatus shown in Figs. 1 and 2, except that the treating chamber is given an elliptical vibration instead of a circular vibration.

Figure 8:
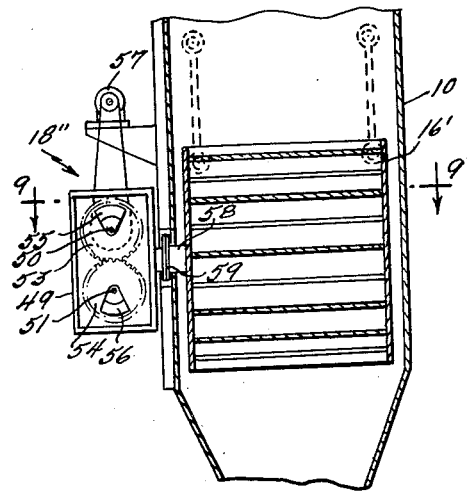
Fig. 8 is a fragmentary vertical sectional view of the apparatus shown in Fig. 3, but showing a modified form of the device for vibrating the treating chamber.
Figure 9:
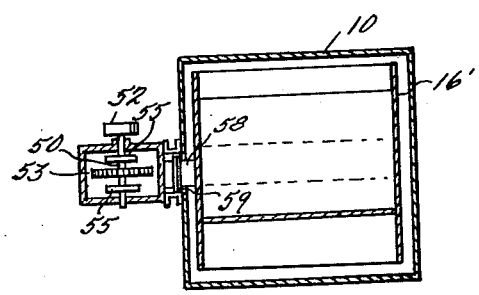
Fig. 9 is a view taken on the line 9—9 of Fig. 8.

In Figs. 8 and 9, there is shown another modified form of the apparatus in which the treating chamber is given a substantially horizontal rectilinear vibrating motion.

In this particular modification, the treating chamber

16' is identical to the chamber 16' of the modification illustrated in Figs. 3, 4 and 5, and is mounted within the tower 10 in an identical manner and carries a plurality of trickling elements 17 similarly arranged therein. However, the vibrating means, indicated at 18", for giving the treating chamber a rectilinear vibratory motion in a substantially horizontal plane are different.

The means for giving the treating chamber 16' a horizontal rectilinear vibration are shown as comprising a housing 49, a vertically spaced pair of horizontal shafts 50, 51 having their ends journaled in the side walls of the housing with one end of the upper shaft 50 projecting beyond the housing and having a pulley 52 fixedly mounted thereon; a pair of identical gear wheels 53, 54 mounted on the shafts 50, 51, respectively, in meshing relation for rotating the shafts in opposite directions at equal speeds; an axially spaced pair of eccentric weights 55 fixedly attached to the upper shaft 50, and an axially spaced pair of eccentric weights 56 fixedly attached to the lower shaft 51, with the eccentric weights on one shaft in radial alignment with and in a radial direction at 180° from those on the other shaft; and a motor 57 for belt driving the pulley 52. The housing is rigidly attached to the casing 16' as by means of a rigid connecting member 58 extending through an opening 59 in the side wall of the tower 10. The construction and arrangement is such that, due to the opposition of the eccentric weight system and their inverse rotation, the eccentric weight effect is canceled vertically and the horizontal effects are combined to produce a substantially horizontal vibration of the chamber 16'.

The operation of the modification is the same as that of the modification shown in Figs. 3, 4 and 5.

In Figs. 10 and 11, there is shown a modified form of apparatus wherein two treating chambers 16' are mounted within the tower 10, one above the other, for rectilinear horizontal vibration therein.

In this particular modification, the treating chambers 16' are identical in construction to the chamber 16' shown in the modification illustrated in Figs. 3, 4 and 5, and each is mounted within the tower 10 in a similar manner to the manner in which the chamber 16' shown in Figs. 3, 4 and 5, is mounted. Each of the chambers 16' carries a plurality of trickling elements 17 arranged in a similar manner to the arrangement of the elements in the chamber 16' of the modification shown in Figs. 3 and 4. However, the vibratory means, indicated at 18''' for giving the chamber 16' a substantially horizontal rectilinear vibratory motion are different. As illustrated in Fig. 10, the vibratory means 18''' are shown as comprising an excentered shaft 60 journaled in suitable bearings 61 carried by a support 62 fixedly attached to the side wall of the tower 10. The shaft 60 has a pulley 63 fixedly attached thereto and is adapted to be belt driven by means of a motor 64. A pair of connecting rods 65, 66 extend through an opening 67 in the side wall of the tower 10, with one of their ends pivotally attached to the top of the lower chamber 16' and the bottom of the upper chamber 16', respectively, and the other of the ends connected to the excenter shaft 60. The ends of the connecting rods attached to the shaft 60 are unphased by 180°. Thus, as the shaft 60 is rotated, the chambers will be vibrated in a substantially horizontal plane in alternate directions with a rectilinear motion.

The operation of the apparatus of this modification is generally similar to that of the modification shown in Figs. 3, 4 and 5, except that the products being treated are made to travel through two treating chambers.

In Fig. 12, there is shown still another modified form of apparatus wherein four treating chambers are mounted within the tower, two in the upper portion and two in the lower portion, with a partition wall separating the two portions of the tower, and with means for directing the flow of the treating gaseous fluid in one direction through the lower portion of the tower and in the opposite direction through the upper portion of the tower.

In this particular modification, the tower 10' is generally similar to the tower shown in Figs. 10 and 11, and is shown as being separated into an upper portion, indicated generally at 68, and a lower portion, indicated generally at 69, by a downwardly inclined gas-tight partition wall 70 provided with a plurality of rotary valves 71 which permit the passage of the solid products from the upper part of the tower into the lower part thereof. A pair of treating chambers 16' are mounted one above the other in the upper part of the tower and a similar pair of treating chambers 16' are mounted one above the other in the lower part of the tower. An inlet conduit 72 is connected to introduce the treating gaseous fluid into the upper end of the lower part of the tower where it travels downward through the pair of treating chambers 16' mounted in the lower part. A conduit 73 connects the bottom portion of the tower to the intermediate portion of the tower just below the bottom of the two treating chambers 16' which are mounted in the upper part of the tower.

The pair of treating chambers 16' mounted in the upper part of the tower 10" and the pair of treating chambers 16' mounted in the lower part of the tower are identical in construction to the pair of treating chambers shown in Fig. 10, and each pair is mounted within the tower in a similar manner to the manner in which the pair of treating chambers 16' are mounted in the chamber 10, as shown in Figs. 10 and 11, and both the upper and lower pairs of treating chambers are vibrated by vibrating means 18''' which are identical in construction to the vibrating means 18''' shown in Figs. 10 and 11.

The operation of this modification of the apparatus is apparent. The treating gaseous fluid enters the tower through inlet conduit 72, passes downwardly through the pair of treating chambers 16' in the lower portion of the tower, then upwardly through the conduit 73 and back into the tower below the upper pair of treating chambers 16' mounted within the upper portion of the tower, then through these treating chambers and out of the tower through outlet conduit 11'.

The solid products being treated are fed into the top of the tower from the hopper 19' and fall into the uppermost one of the pair of treating chambers in the upper part of the tower, then, they trickle downward through the pair of treating chambers 16' and pass through the coffers 71 in the partition wall 70 into the uppermost of the pair of treating chambers 16' in the lower part of the tower. The products trickle downwardly through these treating chambers and fall into the bottom of the tower, from which they are evacuated through valved outlet conduit 14'.

This modified form of apparatus is especially effective in treating solid products by heated gases which products would burn or deteriorate if they were in contact with too hot gases, particularly when the solid products are ignitable.

The apparatus of the present invention, in all of its various modifications as illustrated, is particularly adapted for drying solid products in bulk by subjecting them to a flow of hot gases through the apparatus, either in the same direction as the flow of the products being treated therethrough, or countercurrent thereto. As the hot gas passes longitudinally through the tower and through the treating chambers therein it transmits its heat to the products directly on the one hand and by contact through the intermediary of the trickling elements on the other, thus providing a very effective heat exchange between the hot gas and the products being treated.

From the foregoing, it readily will be apparent that there has been provided novel and improved apparatus for treating solid products in bulk by submitting them to the treating action of a gaseous fluid, which is simple and rugged in construction, in which the products to be treated travel by gravity through one or more treating chambers containing a plurality of inclined trickling elements so constructed and arranged that the products being treated will be caused to trickle across the trickling elements as the products travel by gravity through the treating chambers, and in which controlled vibrating means are provided to vibrate the chambers and the trickling elements therein in a direction transversal to the normal direction of travel of the products across the inclined upper surfaces of the trickling elements to cause the products being treated to follow a zig zag path on the upper inclined surfaces of the trickling elements, whereby the speed of travel of the products across the trickling elements may be controlled by controlling the amplitude and the vibrating speed of the vibrating means.

Obviously, the invention is not restricted to the particular modifications thereof herein shown and described, but is capable of various changes within the scope of the appended claims.

For example, instead of having in one sheath as in Figs. 10 and 11, two chambers driven by a single mechanism with two connecting rods, there can be one chamber 16' driven with a single connecting rod 65, itself being driven by the shaft 50 integral with the pulley 63 driven by the motor 64.

What is claimed is:

1. Apparatus for treating solid products in bulk by means of gaseous fluid, comprising an upright open-ended treating chamber; means for feeding the products to be treated into the open upper end of the chamber so that they will travel through the chamber by gravity; means including conduits for directing a flow of the treating gaseous fluid in one direction through the chamber; a plurality of elongated trickling elements having inclined upper surfaces mounted within said chamber, with each trickling element having the inclination of its upper surface extending in a direction transversal to its longitudinal axis, said trickling elements being so positioned and arranged that the products being treated will be caused to trickle across the upper inclined surfaces of the elements as the products travel through the chamber; and vibrating means connected to vibrate the trickling elements in a direction transversal to the normal direction of travel of the products across the inclined upper surfaces of said elements to cause the products being treated to follow a zig zag path on the upper inclined surfaces thereof as they travel thereacross, whereby the speed of travel of the products across the trickling elements may be controlled.

2. Apparatus as set forth in claim 1, wherein said vibratory means are constructed and arranged to give the trickling elements a circular vibratory movement.

3. Apparatus as set forth in claim 1 wherein said vibratory means are constructed and arranged to give the trickling elements an elliptic vibratory movement.

4. Apparatus as set forth in claim 1, wherein said vibratory means are constructed and arranged to give the trickling elements a substantially horizontal rectilinear vibratory movement.

5. Apparatus for treating solid products in bulk by means of a gaseous fluid, comprising an elongated vertical casing; means for feeding the products to be treated into the top of the casing so that they will travel through the casing by gravity; means for evacuating the treated products from the bottom of the casing; means for passing a treating gaseous fluid longitudinally through the casing; an upright open-ended treating chamber mounted within said casing for vibratory movement therein; a plurality of elongated trickling elements having inclined upper surfaces mounted within and extending across said chamber with their ends fixedly attached to the side walls thereof and with each trickling element having the inclination of its upper surface extending in a direction transversal of its longitudinal axis, said trickling elements being so positioned and arranged that the products being treated normally will be caused to trickle across the upper inclined surface thereof in a direction transversal to the longitudinal axis of the trickling elements as they travel through the chamber; and vibrating means connected to vibrate said chamber and the trickling elements therein in a direction transversal to the normal direction of travel of the products across the inclined upper surfaces of said trickling elements to cause the products being treated to follow a zig zag path on the upper inclined surfaces of the trickling elements whereby the speed of travel of the products across the trickling elements may be controlled.

6. Apparatus as set forth in claim 5, wherein said treating chamber is spring supported within said casing and wherein said vibrating means include a hollow tube fixedly attached to and extending through the chamber with its end projecting through openings in opposite side walls of the casing; a shaft extending through said tube and having an excenter weight pulley fixedly attached to each end; and means for rotating said shaft whereby said chamber will be given a circular vibratory motion.

7. Apparatus as set forth in claim 5, wherein said chamber is suspended within said casing by connecting rods pivotally connected at their upper ends to the casing and at their lower ends to the top of the chamber and wherein said vibrating means include an excenter weight pulley mounted on a shaft journaled in spring supported bearings connected to the chamber by blades flexible in a vertical plane and rigid in a horizontal plane; and means for rotating said pulley whereby said chamber will be given a substantially horizontal rectilinear vibratory motion.

8. Apparatus as set forth in claim 5, wherein said chamber is spring supported within said casing and wherein said vibrating means include an excenter weight pulley mounted on a shaft journaled in spring supported bearings connected to the chamber by blades flexible in a vertical plane and rigid in a horizontal plane; and means for rotating said pulley whereby said chamber will be given an elliptical vibratory motion.

9. Apparatus as set forth in claim 5, wherein said chamber is suspended within said casing by connecting rods pivotally connected at their upper ends to the casing and at their lower ends to the top of the chamber, and wherein said vibrating means include a housing positioned outside the casing and rigidly connected to the treating chamber by a rigid connecting member extending through an opening in the side wall of the casing; a vertically spaced pair of shafts extending across and journaled in the side walls of the housing with each shaft having at least on excenter weight fixedly attached thereto and with the excenter weight on one shaft being in radial alignment with the excenter weight on the other shaft and extending in a radial direction at 180° therefrom; and means for rotating said shafts at equal speed in opposite directions, whereby the vertical effect of the excenter weights will be canceled out and the horizontal effects combined to give a substantially horizontal rectilinear vibratory motion to the treating chamber.

10. Apparatus as set forth in claim 5, wherein said chamber is suspended within said casing by connecting rods pivotally connected at their upper ends to the casing and at their lower ends to the top of the chamber, and wherein said vibrating means comprises an excenter shaft journaled in supports mounted on the outer side wall of the casing; a connecting rod extending through an opening in the side wall of the casing and having one of its ends pivotally connected to the bottom of the chamber and the other of its ends pivotally connected to said shaft; and means for rotating said shaft whereby said chamber will be given a substantially horizontal rectilinear vibratory motion.

11. Apparatus for treating solid products in bulk by means of a gaseous fluid, comprising an elongated vertical casing; means for feeding the products to be treated into the top of the casing so that they will travel by gravity through the casing; means for evacuating the treated products from the bottom of the casing; means for passing a treating gaseous fluid longitudinally through the casing; a plurality of upright open-ended treating chambers mounted one above the other in said casing for vibratory movement therein; each of said treating chambers having a plurality of elongated trickling elements having inclined upper surfaces, mounted therein and extending thereacross with their ends fixedly attached to opposite side walls thereof and with each trickling element having the inclination of its upper surface extending in a direction transversal of its longitudinal axis, said trickling elements being so arranged and positioned that the products being treated normally will be caused to trickle across the inclined upper surfaces thereof, in a direction transversal to the longitudinal axis of the trickling elements, as the products travel through the chamber; and vibrating means connected to vibrate said chambers and the trickling elements therein in a direction transversal to the normal direction of travel of the products across the inclined upper surfaces of said trickling elements to cause the products being treated to follow a zig-zag path on the upper inclined surfaces of the trickling elements whereby the speed of travel of the products across the trickling elements may be controlled.

12. Apparatus as set forth in claim 11, wherein two treating chambers are mounted within said casing, each suspended by connecting rods pivotally connected at their upper ends to the casing and at their lower ends to the top side walls of the chamber and wherein said vibrating means comprises an eccentric shaft journaled in supports mounted on the outer side wall of the casing; a pair of connecting rods extending through an opening in the side wall of the casing and having one of their ends pivotally connected to the bottom end of the upper chamber and the top end of the lower chamber, respectively, and the other of their ends pivotally connected to said shaft with the shaft connection points being unphased by 180°; and means for rotating said shaft whereby said chambers will be given a substantially horizontal rectilinear vibratory motion.

13. Apparatus for treating solid products in bulk by means of a gaseous fluid, comprising an elongated vertical casing; means for feeding the products to be treated into the top of the casing so that they will travel by gravity through the casing; means for evacuating the treated products from the bottom of the casing; a transversally extending gas-tight partition wall mounted within the casing dividing it into an upper portion and a lower portion, said partition wall being provided with valve means to permit the flow of the products being treated from the upper portion to the lower portion; at least one upright open-ended treating chamber mounted in the upper portion of said casing for vibratory movement therein; at least one upright open-ended treating chamber mounted in the lower portion of said casing for vibratory movement therein, each of said chambers having a plurality of trickling elements, having inclined upper surfaces, mounted therein and extending thereacross with their ends fixedly attached to opposite side walls thereof, said trickling elements being so arranged and positioned that the products being treated will be caused to trickle across the inclined upper surfaces thereof as the products travel through the chamber; vibrating means connected to vibrate said chambers and the trickling elements therein in a direction transversal to the normal direction of travel of the products across the inclined upper surfaces of said trickling elements to cause the products being treated to follow a zig zag path on the upper inclined surfaces of the trickling elements whereby the speed of travel of the products across the trickling elements may be controlled; and means including conduits connected to the casing for directing a flow of the treating gaseous fluid downwardly through the treating chambers in the lower portion of the tower and upwardly through the treating chambers in the upper portion of the tower.

14. Apparatus for drying solid products in bulk by means of heated gas, comprising an elongated vertical casing; means for feeding the products to be dried into the top of the casing for gravity flow therethrough; means for evacuating the dried products from the bottom of the casing; an upright open-ended treating chamber mounted within said casing for vibratory movement therein; a plurality of vertically spaced horizontally extending rows of laterally spaced flat elongated inclined trickling members fixedly mounted within said chamber, said trickling members having the direction of their inclination transversal to their longitudinal axis, with the trickling members in each row inclined downwardly in the same direction and with the direction of inclination in each row being opposite to the direction of inclination of the members in the rows immediately thereabove and therebelow, whereby the products being dried normally will trickle across the members in each row in a direction transversal to the longitudinal axis of the trickling elements and onto the members in the row therebelow; controlled vibrating means connected to vibrate said chambers and the trickling members therein in a direction transversal to the normal direction of travel of the products across the inclined upper surfaces of said trickling elements to cause the products being dried to follow a zig-zag path on the trickling members, whereby the speed of travel of the products across the trickling members may be controlled; and means for directing a flow of heated gas longitudinally through the casing and chamber, whereby the products will be subjected to direct heat exchange with the gas and to indirect heat exchange with the gas through the intermediary of the trickling members.

References Cited in the file of this patent

UNITED STATES PATENTS

| | | |
|---|---|---|
| 206,431 | Flumerfelt | July 30, 1878 |
| 582,574 | Barthelemy | May 11, 1897 |
| 693,455 | Stanley | Feb. 18, 1902 |
| 1,052,390 | Turner | Feb. 4, 1913 |
| 2,278,701 | Karr | Apr. 7, 1942 |

FOREIGN PATENTS

| | | |
|---|---|---|
| 159,733 | Switzerland | Apr. 1, 1933 |
| 476,836 | Germany | May 29, 1929 |
| 494,899 | Germany | Mar. 29, 1930 |
| 663,410 | Germany | Aug. 5, 1938 |